United States Patent
Moran et al.

(10) Patent No.: US 7,380,271 B2
(45) Date of Patent: May 27, 2008

(54) GROUPED ACCESS CONTROL LIST ACTIONS

(75) Inventors: Anthony Scott Moran, Santa Cruz, CA (US); Brian James Turner, Santa Cruz, CA (US); Peter Sean Calvert, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 09/903,704

(22) Filed: Jul. 12, 2001

(65) Prior Publication Data

US 2003/0088786 A1    May 8, 2003

(51) Int. Cl.
*H04L 9/00* (2006.01)
*H04L 9/32* (2006.01)
*G06F 12/14* (2006.01)

(52) U.S. Cl. .................. 726/4; 713/166; 713/167; 726/21

(58) Field of Classification Search ............... 713/154, 713/201; 707/9
See application file for complete search history.

(56) References Cited

U.S. PATENT DOCUMENTS

| | | | |
|---|---|---|---|
| 4,525,780 A | 6/1985 | Bratt et al. ............... 364/200 |
| 5,173,939 A | 12/1992 | Abadi et al. ............... 380/25 |
| 5,315,657 A | 5/1994 | Abadi et al. ............... 380/25 |
| 5,335,346 A | 8/1994 | Fabbio ....................... 395/600 |
| 5,347,578 A * | 9/1994 | Duxbury ..................... 707/9 |
| 5,701,458 A | 12/1997 | Bsaibes et al. ............ 395/609 |
| 5,825,877 A | 10/1998 | Dan et al. .................... 380/4 |
| 5,956,715 A | 9/1999 | Glasser et al. ............... 707/9 |
| 6,061,684 A | 5/2000 | Glasser et al. ............... 707/9 |
| 6,167,052 A | 12/2000 | McNeill et al. ............ 370/399 |
| 6,202,066 B1 * | 3/2001 | Barkley et al. ............... 707/9 |
| 6,237,036 B1 * | 5/2001 | Ueno et al. .................. 709/225 |
| 6,772,350 B1 * | 8/2004 | Belani et al. ................ 726/2 |

(Continued)

FOREIGN PATENT DOCUMENTS

JP    09-212367 A    8/1987

OTHER PUBLICATIONS

IBM Technical Disclosure Bulletin, Oct. 1992, vol. 35, No. 5, pp. 488-489.

(Continued)

*Primary Examiner*—Gilberto Barron, Jr.
*Assistant Examiner*—Kaveh Abrishamkar
(74) *Attorney, Agent, or Firm*—Robert H. Frantz; Jeffrey S. LaBaw (57) ABSTRACT

Access Control Lists (ACLs) are used to describe the permitted actions (permissions) on protected network computer system resources or objects associated with an client or user identity. An identity may be an individual user or group of users. The actions are used to represent the different access methods available on a particular projected object or resource. A new action grouping mechanism is provided which tags each action with an action group name. The grouping of actions facilitates a larger permission set to be defined in an ACL, whereas action permission indicators can be reused for unique action definitions within various action groups. This effectively extends the finite total number of permissions available within a security system, allows a more descriptive and extensible permission mechanism in an Access Control List, as well as aiding in the simplification of management and definition of security policies.

8 Claims, 8 Drawing Sheets

U.S. PATENT DOCUMENTS

| | | | |
|---|---|---|---|
| 6,816,906 B1 * | 11/2004 | Icken et al. | 709/229 |
| 7,016,945 B2 * | 3/2006 | Bellaton et al. | 709/219 |
| 2001/0056494 A1 * | 12/2001 | Trabelsi | 709/229 |
| 2002/0026592 A1 * | 2/2002 | Gavrila et al. | 713/201 |

OTHER PUBLICATIONS

IBM Technical Disclosure Bulletin, Sep. 1993, vol. 36, No. 09A, pp. 417-418.

IBM Technical Disclosure Bulletin, Dec. 1991, vol. 34, No. 7B, pp. 127-129.

* cited by examiner

Figure 1

*Prior Art*

Figure 2

*Prior Art*

Figure 3

*Prior Art*

*Prior Art*

GROUPED ACCESS CONTROL LIST ACTIONS

BACKGROUND OF THE INVENTION

1. Field of the Invention

This invention relates to the arts of securing access to resources (objects) on networked server computers for use by authenticated client computers, and especially to methods and systems which allow for extensions to and grouping of permitted actions to protected objects.

2. Description of the Related Art

Many organizations now value the public Internet and private intranets as effective and vital mediums for global communication. Electronic commerce has rapidly become an essential component of many business marketing strategies. Educational institutions rely on the Internet for long-distance learning. On-line services allow individuals to send electronic mail and to tap the Web's vast encyclopedia of resources. Traditional applications, such as TELNET and POP3, still prevail as important network services.

Businesses want to use the Internet as a global commercial and distribution vehicle, but have been hindered by the lack of proven security policy mechanisms and management systems. A mixture of dissimilar hardware and software usually impacts a network in the following ways:
   (a) no centralized control of security for applications;
   (b) no unified resource location naming convention;
   (c) no common support for high availability of applications; and
   (d) no common support for scalable growth.

New business models require organizations to expose their information resources to a previously unthought of degree. These businesses need to know that they can securely control access to those resources.

Managing security policy and users access rights across distributed networks has proven difficult for Information Technology (IT) managers, especially since individual application and system vendors implement authorization in their own proprietary fashion.

In most computer resource security systems, authorization processes are distinct from authentication processes. Authentication, which is typically performed first, ensures that the individual (or client process) is who he or she claims to be, but determines nothing about his or her specific rights to perform operations on a protected computer resource. Part of the typical authentication process involves the acquisition of a "credential" that describes the identity of the client.

Following authentication, an authorization process determines whether an authenticated user has the right to perform a specific operation on a specific resource in a secure domain. Authorization decisions are typically made based on the user's credentials.

Companies realize that developing new authorization services for each enterprise application is an expensive process that leads to a difficult-to-manage infrastructure. A centralized authorization service that is accessed by developers via a standardized API greatly speeds the time to market, and reduces the total cost of ownership of an application or a system.

In network security parlance, there are several terms commonly in use. For better understanding of the present invention, a definition of some of these terms is presented. A "Secure Domain" is a group of users, systems, and resources that share common services and usually function with a common purpose. An "Access Control List (ACL) policies" are the security mechanisms that provide users the permissions to perform specific operations, or actions on protected resources. "Authentication" is the process of identifying any individual attempting to login to a secure domain, resulting in the generation of user credentials. "Authorization" is the process performed for determining whether an individual user has the right to perform an operation on a protected resource. "Credentials" are detailed information, acquired or generated during authentication, describing the user and other security-related identity attributes. "Protected Object Policy" ("POP") refers to the security mechanism that dictates special conditions for accessing a protected resource after a successful ACL policy check. A user "registry" is the datasource (LDAP, DCE, or Domino) that maintains account information for users and groups of users who are allowed to participate (use) in the secure domain.

Many of the security management systems use a finite set of permission indicators, such as alphabetic characters, within entries in the policy database or repository to indicate a user's or user group's rights to access and use a protected object to which the policy is attached. This finite set of permission indicators sets a finite limit as to how many protected objects may be controlled using the syntax of the system's policy repository.

Finite limitations of the number of policy permissions in an ACL entry are undesirable facets of a network security management system, which complicates and limits the ability of a security administrator to effectively implement and manage a security plan. Therefore, there is a need in the art for a method to extend the finite number of ACL permissions for security policy management systems.

Further, certain types of actions can be categorized into logical groupings, such as actions commonly needed by Java applications, or actions commonly needed by local administrators. In order to allow more effective management of actions by such categorization, there exists a need in the art for a system and method to define sets of actions into action groups.

BRIEF DESCRIPTION OF THE DRAWINGS

The following detailed description when taken in conjunction with the figures presented herein provide a complete disclosure of the invention.

SUMMARY OF THE INVENTION

Access Control Lists (ACLs) are used to describe the permitted actions (permissions) on protected network computer system resources or objects associated with an client or user identity. An identity may be an individual user or group of users. The actions are used to represent the different access methods available on a particular projected object or resource. A new action grouping mechanism has been defined which tags each action with an action group name. The grouping of actions facilitates a larger permission set to be defined in an ACL, whereas action permission indicators can be reused for unique action definitions within various action groups. This effectively extends the finite total number of permissions available within a security system, allows a more descriptive and extensible permission mechanism in an Access Control List, as well as aiding in the simplification of management and definition of security policies.

DETAILED DESCRIPTION OF THE INVENTION

The present invention is preferably realized in conjunction with Tivoli's Policy Director [TM] product, running on a suitable operating system, such as HP-UX [TM], Solaris [TM], UNIX, or IBM's AIX [TM]. Policy Director [TM] may be run on any suitable networked computer server platform, such as "personal computers", as well as mainframe servers. It will, however, be recognized by those skilled in the art, that the authorization process disclosed herein may be realized individually, independently, or as an improvement to another authorization process on an alternate server platform. As such, the following detailed disclosure is given with respect to the preferred embodiment associated with the Policy Director [TM] product, which should not be viewed as a limitation or requirement of the present invention.

In a typical security policy system, an authentication service first accesses the user registry to determine if the user exists in the registry, as well as to determine any user groups to which the user may belong. For example, if the user is an employee of ABC Corp., and his user name is B_Smith, the registry will contain an entry authenticating the user "B_Smith", and possibly a user group definition including "B_Smith" as a member of a group such as "ABC_employees". The authentication service then prepares a data set of "credentials" indicating that B_Smith is authenticated, and that B_Smith is a member of user group "ABC_employees".

These credentials, along with the action requested and the protected object to which the action is requested, are passed into an authorization service for determination if the user, or a user group to which he or she belongs, is authorized (permitted) to perform the requested action on the requested protected object.

Figure 1:
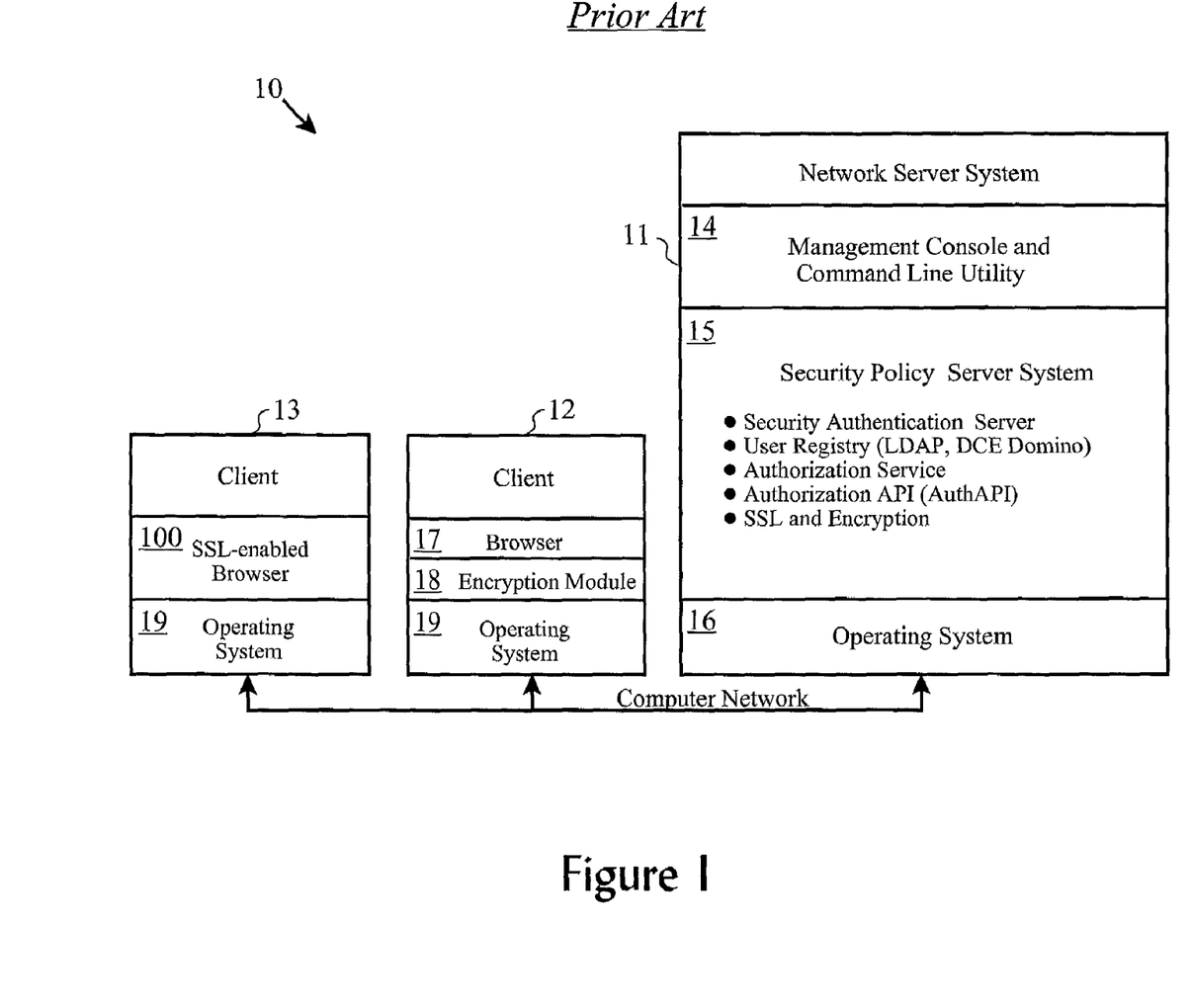
FIG. 1 discloses the organization and relationship of software for both client and server systems.

Turning to FIG. 1, a typical security policy management system is shown, which includes software for both client (12, 13) and security server (11) computer systems, all of which are communicably interconnected by a computer network such as an intranet, local area network, or the Internet A Management Console (14) may provide a graphical administrator interface to manage security policy for the secure domain. From the Management Console (14), a security administrator can perform administrative tasks on the user registry and the master authorization policy database. Typical console tasks include adding and deleting user accounts, and applying ACL and POP policies to objects.

Additionally, a command line utility may provide a means for performing all system tasks, whereas typically a Management Console only provides a limited range of tasks.

A Security Policy Server System (15) is an LDAP or DCE server that provides authentication services, maintains a centralized registry database which contains account entries for all valid users who participate in the secure domain, provides authorization services (for properly authenticated users), and maintains the ACL policies.

The Security Policy Server (15) performs two important roles:
 (a) defines the roles the user can assume; and
 (b) provides authentication services for all login attempts.

The Security Server can replicate the registry database throughout the secure domain to prevent a single point of failure. The Security Server is responsible for updating all replica databases whenever a change to the master registry occurs.

The Security Policy Server System (15) also maintains the master authorization policy database for the secure domain. It is also responsible for updating all authorization database replicas throughout the secure domain, as needed. The Server also maintains location information about the other security servers in the secure domain.

For the client machines (12), a small, light-weight network support module (18) that works as a secure proxy for client applications may be provided to allow end-to-end encryption over a GSSAPI tunnel of all client/server traffic, especially for non-Secure Socket Layer (SSL) enabled browsers.

A Security Policy Server System may also include an Authorization API (AuthAPI) that allows developers build security and authorization directly into corporate applications through use of a standardized interface to the authorization service.

Figure 2:
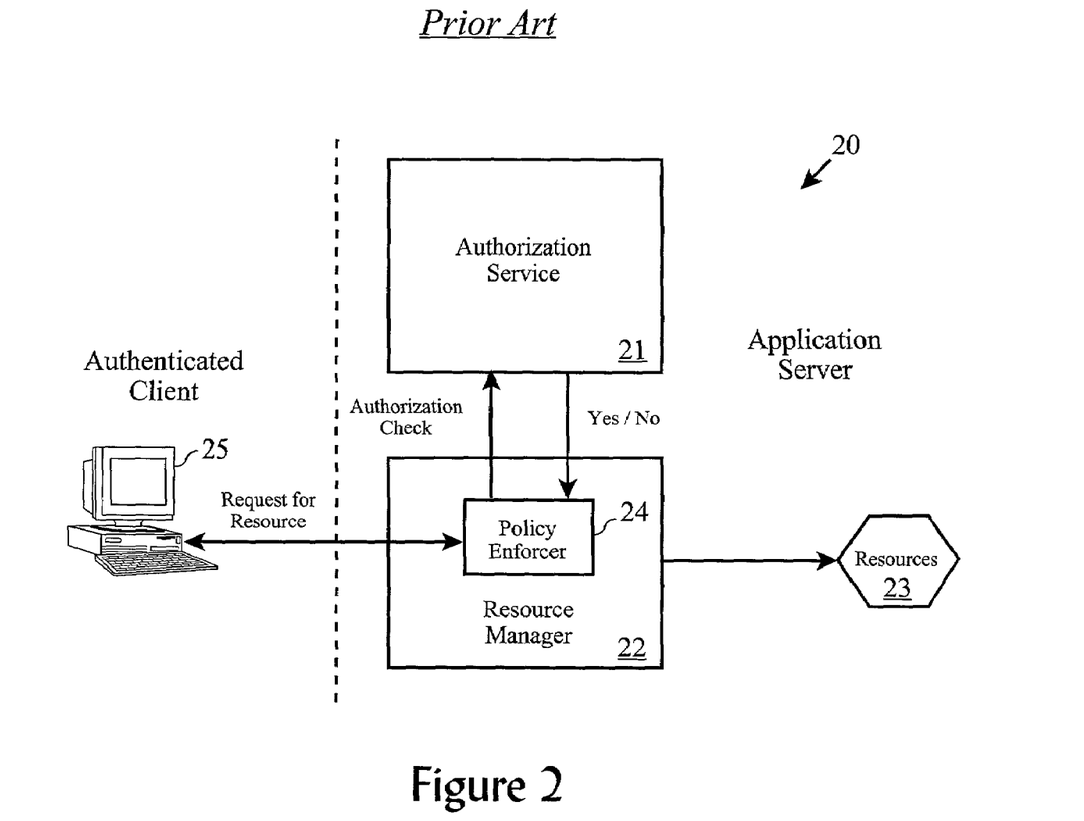
FIG. 2 shows a generalized authorization model.

FIG. 2 shows a general authorization model of a security policy management system. Applications may use the function calls provided by AuthAPI to communicate to the Authorization Service (21). The Authorization Service (21) functions as the authorization decision-making evaluator.

When a client or user initially requests permission to perform an action on a protected object, such as requesting to "read" or "modify" a protected system file, the client's ID is first authenticated by the authentication service. This results in a set of credentials being created, including the authenticated user's ID or user name, a list of user groups to which the user may belong, the name of the protected object being requested, and the action being requested. For example, the credentials and authorization request for Bill Smith of ABC Corporation, as discussed before, attempting to "modify" a protected system file "ABC_401k_summaries" may contain parameters such as:

B_Smith, ABC_employees, "modify", "ABC_401k_summaries".

The Policy Enforcer (24) of the Resource Manager (22) then uses the AuthAPI to forward an authorization decision request ("authorization check") to the Authorization Service (21).

The Authorization Service returns to the Resource Manager (22) a recommendation based on security policy, such as a "yes" or "no" indicator, based upon a query of the security policy attached to the requested protected object.

Figure 3:
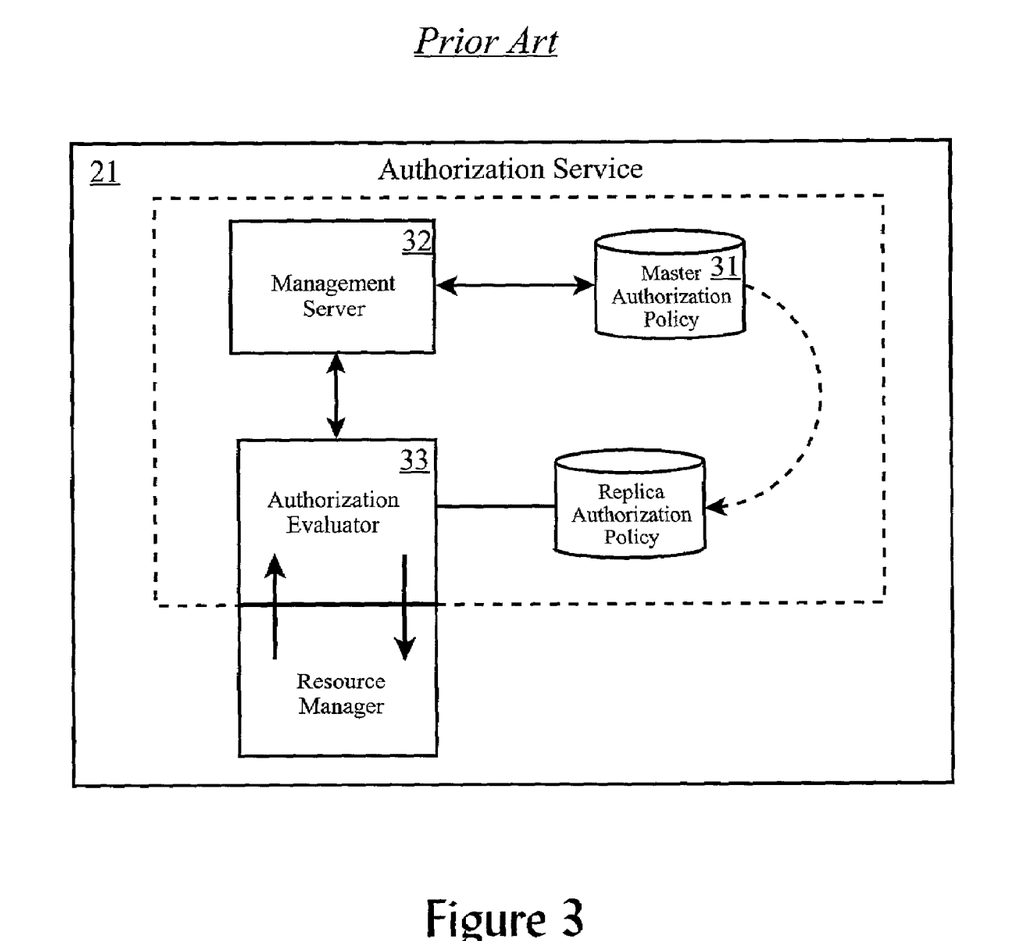
FIG. 3 shows the organization of an Authorization Service in three primary components.

Turning to FIG. 3, an Authorization Service (21) can be comprised of three basic components:
 (a) a Master Authorization Policy (31) database;
 (b) a Management Server (32); and
 (c) the Authorization decision-making Evaluator (33).

The Master Authorization Policy (31) database contains the security policy information for all resources within the secure domain. The aforementioned Management Console may be used to enter and modify the contents of this database.

The Manager Server (32) maintains the Master Authorization Policy database, replicates this policy information throughout the secure domain, and updates the database replicas whenever a change is made to the master. The Management Server (32) also maintains location information about the other security policy management servers operating in the secure domain.

The Authorization Evaluator (33) is the decision-making process that determines a particular requesting client's ability to access a protected resource based on the security policy. The evaluator makes its recommendation to the resource manager which, in turn, allows or disallows a client to complete an action on a protected resource object.

Figure 4:
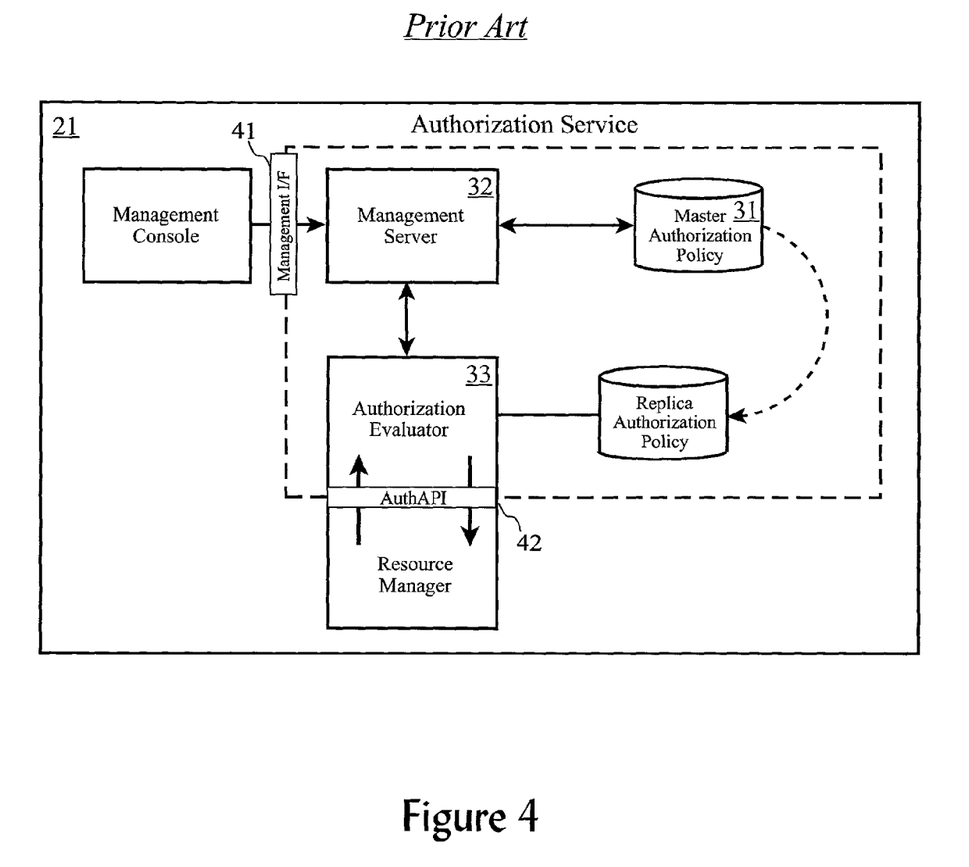
FIG. 4 sets forth details of the two interfaces of the Authorization Service where interaction takes place.

The Authorization Service (21) has two interfaces where interaction takes place, as shown in FIG. 4, the Management Interface (41) and the Authorization API (42).

Through the Management Interface (41), the security administrator may manage the security policy of the network by using a Management Console and/or a command line utility to apply policy rules (e.g. templates) on network resources and register the credentials of participants in the secure domain. The Management Console applies this security policy data to the master authorization policy database via the Management Server. A policy rule for a protected object may be created and attached to a protected object so that any request to perform an action on that protected object results in the attached policy rules being consulted by the Authorization Service (21).

The second interface, the Authorization API (42), passes requests for authorization decisions from the resource manager to the authorization evaluator (33), which then passes back a recommendation or decision result.

The Authorization Service (21) uses a central database that lists all resources in the secure domain and the ACL and POP policies assigned (attached) to each resource. This master authorization policy (31) database and the user registry (containing user and group accounts) are the key components that help define a network security policy.

Figure 5:
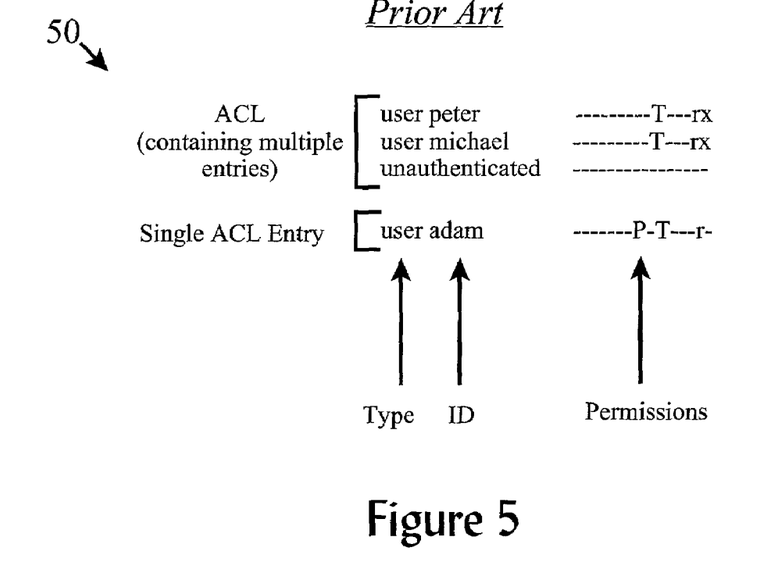
FIG. 5 shows an example access control list policy, or "ACL policy", containing a set of controls or permissions that specifies the conditions necessary to perform certain operations on that resource.

As shown in FIG. 5, an access control list policy (50) or "ACL policy", is the set of controls or permissions that specifies the conditions necessary to perform certain operations on the protected resource object to which it is attached.

An ACL policy is made up of one or more entries that include user specific permissions or rights. ACL policies provide the Authorization Service with information to make a "yes" or "no" answer on a specific request to access a protected object, and to perform some operation on that object.

Each entry on the ACL policy contains a "type", such as a single user's set of permissions, or a set of permissions to an entire group of users. For example, the multiple entry ACL shown may be attached to the system file "ABC_401k_summaries", and it shows that user "B_Smith" has certain permissions or is allowed certain actions to this file (explained in more detail in the following text).

Figure 6:
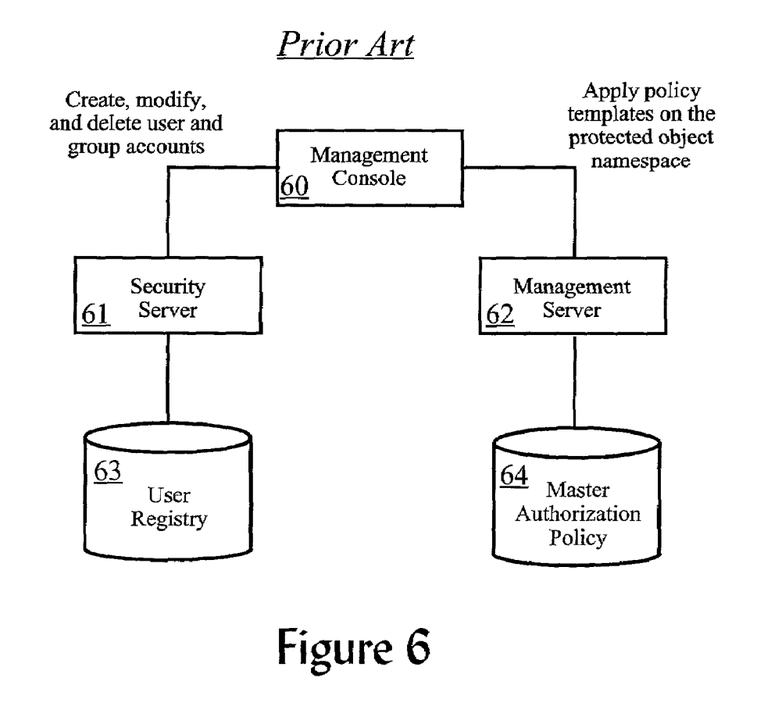
FIG. 6 illustrates the capabilities of a security policy management server system Management Console, which is used to manage security policy in a secure domain.

Turning to FIG. 6, a Management Console (60) is typically a graphical application used to manage security policy (64) in a secure domain. The command line utility provides the same administrative capabilities as the Management Console, plus commands not supported by the Console.

From the Management Console or command line utility, a security administrator can manage the user registry (63), the master authorization policy database (64), and all Policy Director servers. The administrator can also add and delete users, and apply ACL and POP policies to network objects.

Figure 7:
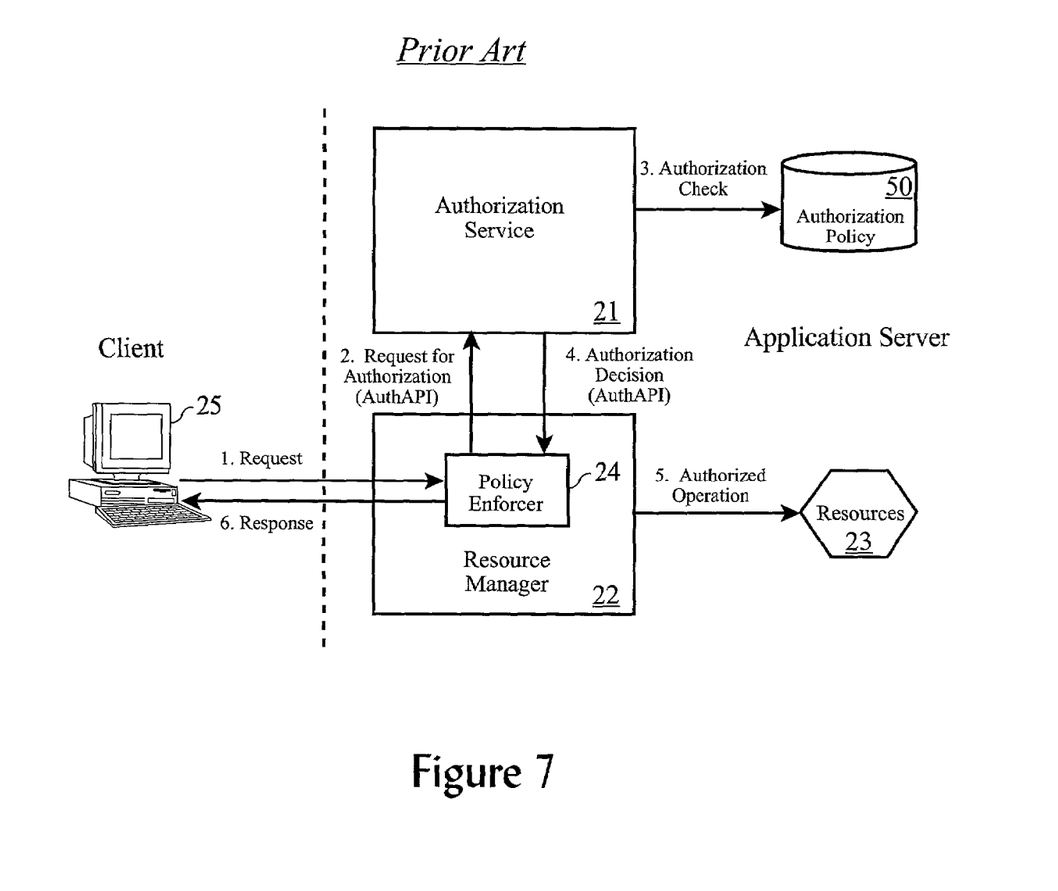
FIG. 7 illustrates an authorization process in detail.

FIG. 7 illustrates a typical authorization process in greater detail. First, subsequent to client authentication, the request for permission to take a specific action on a specific protected resource (23) is directed to the resource manager server (22), and intercepted by the policy enforcer process (24).

Next, the policy enforcer process (24) uses the Authorization API to call the Authorization Service (21) for an authorization decision, passing to it the credential set created by the authentication process including the authenticated user ID, list of groups to which the user may belong, an indicator of the specific action requested, and an indicator of the specific protected object upon which action is requested.

Then, the Authorization Service (21) performs an authorization check on the resource, represented as an object in the protected object space. The ACL policy (50) attached to the targeted or requested object is checked against the client's (25) credentials to determine if he or she has specific rights to perform the requested action.

The decision to accept or deny the request is returned as a "recommendation" to the resource manager (22) via the policy enforcer (24). If the request is approved, the resource manager (22) passes the request on to the application responsible for the resource, and the action may be allowed.

In most systems, each ACL policy has a unique name, or label. Each ACL policy can be applied (attached) to one or more objects. An ACL policy (50) as shown in FIG. 5 consists of one or more entries that include user and group designations, and their specific permissions.

A typical ACL entry contains either two or three attributes depending on the ACL entry type, and appears in the format:

type ID permissions where:
(a) "type" is the entity category (user or group) for which the ACL was created.
(b) "ID" (e.g. "Identity") is a unique identifier or name of the entity. The ID attribute is not required for the any-authenticated and unauthenticated ACL entry types.
(c) "permissions" (e.g. "actions") indicates the set of allowable or permitted operations on the resource object by this user or group.

An ACL entry for a "user" type represents any authenticated Policy Director identity. Typically, users represent network users or application servers.

An ACL entry for a "group" type is a set of permissions allowed for an entire group users. A network administrator can use group ACL entries to easily assign the same permissions to multiple users. New users to the secure domain gain access to objects by becoming members of appropriate groups. This eliminates the need to create new ACL entries for every new user—the user must only be entered into a user group definition in the user registry, which results in the authentication process including this group name in the user's credentials, which then results in authorization for any actions allowed to the group in the ACL. Users and groups are collectively referred to as "entities."

Most permissions dictate the client's ability to perform a specific operation on the resource to which the ACL policy is applied or attached. For example, an ACL entry such as:

user, adam, --------------r- allows the user named "adam" permission to read or view the object protected by this ACL policy. The "r" permission allows the read operation.

An ACL entry type identifies the user, group, or special entity for a specific ACL entry as shown in TABLE 1.

TABLE 1

ACL Entry Type Definitions

| TYPE | DESCRIPTION |
|---|---|
| user | Sets permissions for a specific user in the secure domain. The user must be a member of the secure domain with an account in the registry. The user entry type requires a user name (ID).<br>The entry format is: user ID permissions<br>For example: user anthony-------T-----r- |
| group | Sets permissions for all members of a specific group in the secure domain. The group entry type requires a group name (ID).<br>The entry format is: group ID permissions<br>For example: group engineering-------T-----r- |
| any-authenticated<br>(also known as "any-other") | Sets permissions for all authenticated users. No ID designation is required.<br>The entry format is: any-authenticated permissions.<br>For example: any-authenticated-------T-----r- |
| unauthenticated | Sets permissions for those users who have not been authenticated by the Security Server. No ID designation is required.<br>The entry format is: unauthenticated permissions<br>For example: unauthenticated-------T-----r-<br>This ACL entry is a mask (a bit-wise "and" operation) against the any-authenticated ACL entry to determine the permission set.<br>For example: unauthenticated-------------r-<br>masked against this any-authenticated ACL entry:<br>any-authenticated-------T-----r-<br>results in these permissions:<br>-------------r-(read only). |

The ACL entry "ID" is the unique identifier, or name, for a user or group entry type. ID's must represent valid users and/or user groups created for the secure domain and stored in the registry database.

Examples:
user michael
user anthony
group engineering
group documentation
group accounting Each ACL entry contains a set of "permissions" (or actions) that describe the specific operations permitted on the object by the user or group. ACL policies control protected resources in the following ways:

(a) a user's ability to perform operations on protected objects;

(b) an administrator's ability to change access control rules on the object and any sub-objects; and (c) policy Director's ability to delegate user's credentials.

ACL permission indicators (e.g. the letters used in the string of permissions) are context-sensitive—the behavior of certain permissions varies according to the region of the protected object space in which they are applied.

Typically, a finite number of policies or permissions can be controlled by an entry in an ACL due to limitations of the syntax used in the ACL format. For example, Tivoli's Policy Director [TM] product defines 18 default or pre-defined permissions or actions, and allows for a total of 32 actions including custom actions and the default actions. The Management Console divides these permissions into four categories, as shown in TABLE 3.

TABLE 3

Tivoli's Policy Director [TM] Default Permission Categories

| ACTION BIT OR INDICATOR | ACTION DESCRIPTION | CATEGORY |
|---|---|---|
| a | Attach | Base |
| A | Add | Base |
| b | Browse | Base |
| B | Bypass Time-of-Day | Base |
| c | Control | Base |
| C | Connect | NetSEAL |
| d | Delete | Generic |
| f | Forward | NetSEAL |
| g | Delegation | Base |
| l | List Directory | WebSEAL |
| m | Modify | Generic |
| N | Create | Base |
| r | Read | WebSEAL |
| s | Server Administration | Generic |
| T | Traverse | Base |
| v | View | Generic |
| W | Password | Base |
| x | Execute | WebSEAL |

Other policy management systems may use alternate ACL entry formats and permission indicators, but in general, there is a finite limit to the number of permissions or actions which be can controlled by an ACL entry due to the syntax adopted by the system provider.

Policy Director follows the aforementioned authenticate-then-authorize model, as do many other network security management systems. For example, a user accessing a Web-based retirement fund application would be able to view personal account information after an authorization server verifies the identity, credentials, and privilege attributes of that user.

Policy Director also employs a standards-based Authorization API ("AuthAPI") which allows application programs to make standardized calls to the centralized Authorization Service, thus eliminating the necessity for developers to write authorization code for each new application.

Whereas certain details regarding the operation of a typical security policy management server have been presented, and whereas these details are equally applicable to Policy Director [TM], the remaining portion of this disclosure is given relative to improvements or additions to an existing security policy management server such as Policy Director.

According to the present invention, the functionality of an authorization service is extended to allow for definition of and analysis of action groups as well as individual actions. The default set of actions which are predefined by a network security management system are maintained, and are defined to be in a group named "Primary". The enhanced authorization service allows for the interpretation of enhanced permission lists in ACL entries such that permission indicators can be reused in custom action groups.

For example, the permission indicator "r" in the Primary Action Group may be pre-defined to mean "read", as described in the BACKGROUND OF THE INVENTION previously. According to the invention, an enhanced ACL allows a new action group (or multiple new action groups) to be defined, such as "backup_actions" and "restore_actions".

In these new action groups, the permission indicator "r" may be reused or redefined for an action other than that of the Primary Action Group (or for other action groups, for that matter). Each new action group can be viewed as a container of actions of up to the maximum limit allowed by the ACL entry syntax. For example, Policy Director provides 32 action or permission indicators, so an enhanced ACL would allow 32 groups or containers of up to 32 action or permission indicators, for a total possible of 1032 unique permissions or actions controllable by the new ACL structure.

Further, each enhanced ACL policy has a unique name or label, and each ACL policy can be applied to one or more protected objects.

Figure 8:
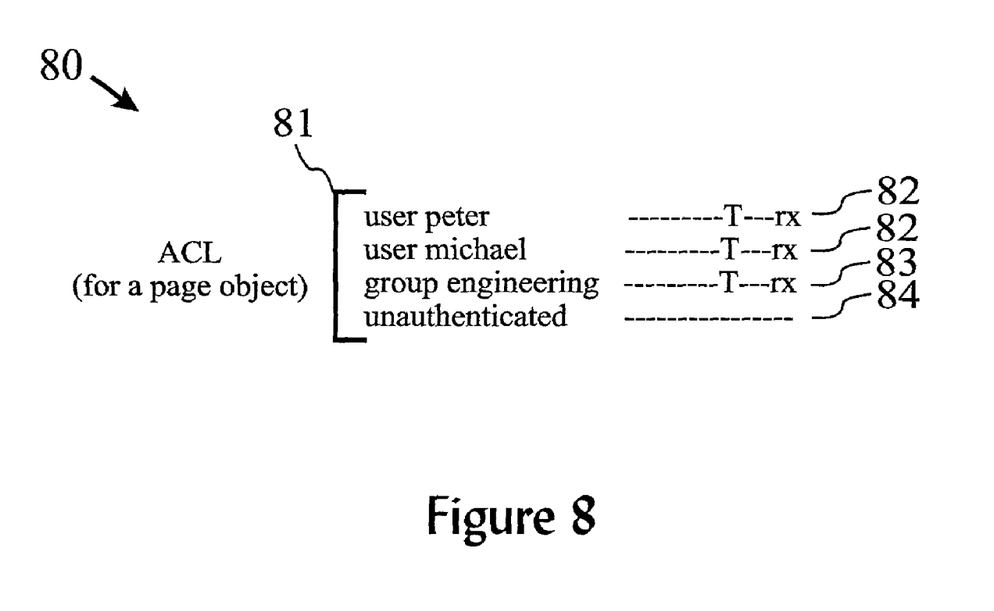
FIG. 8 shows details of the enhanced ACL policy of the invention, consists of one or more entries that include action group designations within permission lists.

Turning to FIG. 8, an enhanced ACL policy (80) as shown which consists of one or more "standard" entries as previously described (82, 83 and 84), as well as one or more enhanced ACL entries (85) that include user or user group designations and their specific permissions with an enhanced permission list.

In the case of an enhanced ACL entry, the use and definition of the "type" and "ID" field is unchanged from conventional use and definition.

An enhanced ACL entry, however, allows for a permission list which indicates that a permission indicator is from the Primary Action Group or from another action group. The enhanced ACL entry allows for the permission list to have Action Group Names embedded in the permission list to indicate that action indicators following the action group name are permissions not for the Primary Action Group, but for the customized actions of that action group. So, the syntax for the permissions list is enhanced as follows:

```
<action>...<action>[<action-group-name>]<action>...<action>...
where:
    <action> is an action indicator, such as the a letter a-z or A-Z; and
    [<action-group-name] is the name of the action group which defines
        the permissions granted by the following action indicators.
```

According to the preferred embodiment and for backwards compatibility with standard ACL permission lists, all of the action indicators are assumed to be from the Primary Action Group if no action group name is indicated in a permission list. For example, as shown in FIG. 8, the entry (85):

user B_Smith Trx[backup_actions]Pqx[restore_actions]Trq grants to the user "B_Smith" the Primary Group Actions "T", "r", and "x", as well as the permissions "P", "q" and "x" from the "backup_actions" action group. It also grants the permissions "T", "r" and "q" from the "restore_actions" action group.

The permission "x" in the Primary action group may be different than the permission "x" from the backup_actions action group. Similarly, the actions "T" and "r" from the primary group may be different from the "T" and "r" permissions from the restore_actions action group. This allows a particular action indicator, such as a letter or number, to be reused for different permissions from different action groups, thereby expanding or extending the total number of actions or permissions which can be controlled with a finite set of action indicators.

According to the preferred embodiment when implemented, a security administrator can use a command line "action group create" command to create a new action group using a syntax such as:

```
command> action group create <action-group-name>
where:
    <action-group-name> is the name for the new action group
```

For example:

```
command> action group create backup_actions
command> action group list
    primary
    backup_actions
command> action group delete backup_actions
command> action group list
    primary
```

Further according to the preferred embodiment, a security administrator can use an "action create" command to create a new action within an action group as follows:

```
command> action create <action-name> <action-label>
    <action-type> <action-group-name>
where:
    <action-name> is the action indicator letter (a-z, A-Z)
        representing the action or permission;
    <action-label> is a descriptive label for this action;
    <action-type> is an action category including categories Base,
        Generic, WebSEAL, NetSEAL; and
    <action-group-name> is an action group where this new action
        belongs (if this argument is not specified, the action is
        assigned to the Primary Action Group).
```

For example:

```
command> action create P copy_volume Special backup_actions
command> action list backup_actions
    P copy_volume Special
command> action delete P backup_actions
command> action list backup_actions
command>
```

Figure 9:
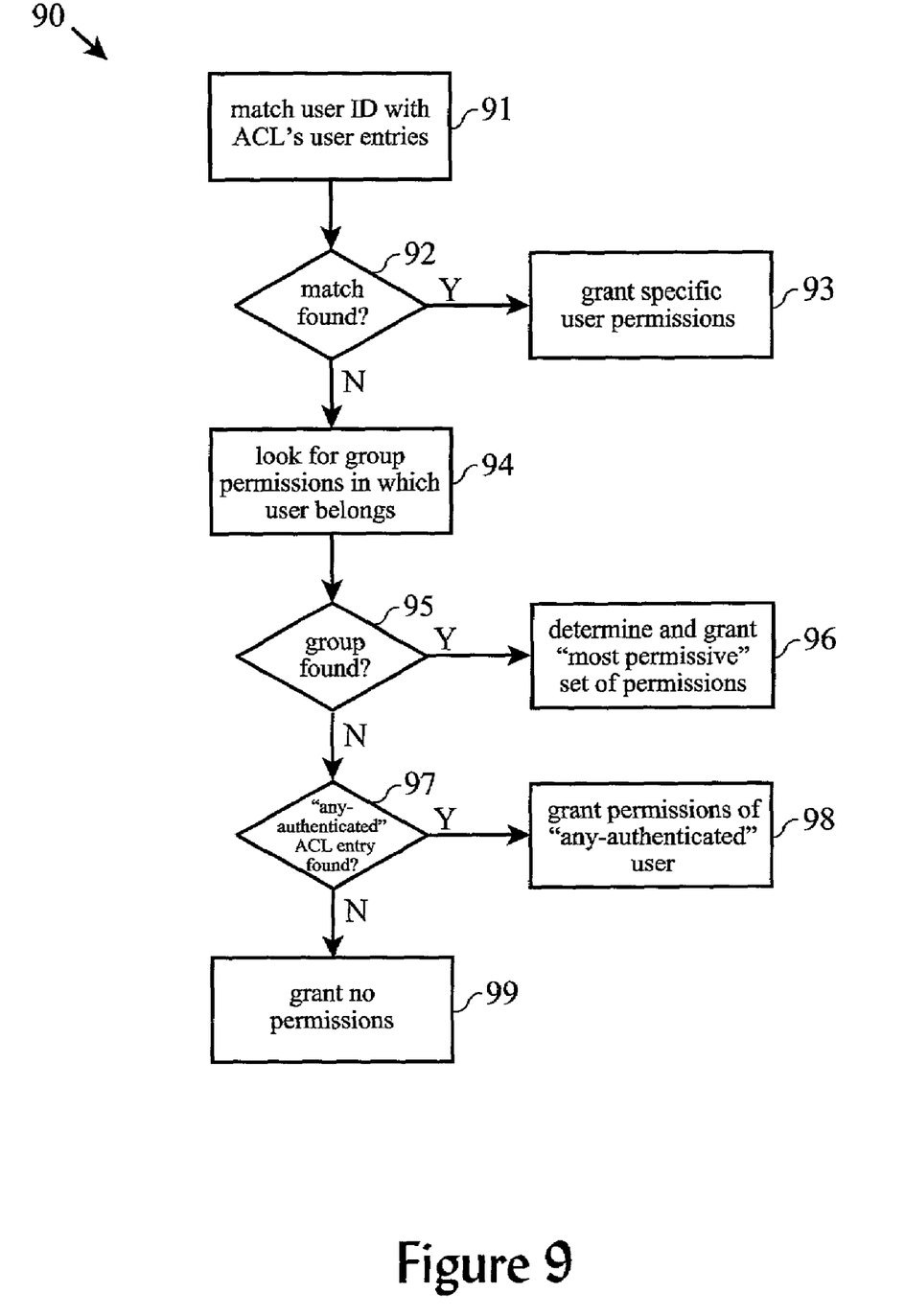
FIG. 9 sets forth the logical process of determining resource authorization of a requesting user based upon the enhanced ACL policies, including the possibility of granting permissions based upon an action group definition.

The invention follows a specific authorization process to determine the permissions granted to a particular user by an enhanced ACL, as shown in FIG. 9. The authorization process is performed after the authentication process has been completed for a particular user or client.

First, the user ID from the authenticated credentials is matched (91) with the requested protected object's ACL entries. The permissions granted (93) are those in the matching entry or entries. If a match is found for the user's ID, the evaluation stops here. If any permissions are granted from an Action Group other than Primary, permissions according to the Action Group's definition are granted.

Next, the requested object's ACL entries are searched (94) for matches to any of the user groups to which the requesting user belongs according to the user's credentials. If any group entry is matched (95), the resulting permissions are a logical "or" (most permissive) of the permissions granted (96) by each matching entry, including any permissions that are granted from an Action Group other than Primary, according to the preferred embodiment.

Otherwise, if no direct ACL entries are matched to either the user's ID or a group to which the user belongs, the ACL policy for the requested resource is searched (97) for an "any-authenticated" entry. If one exists, the permissions defined by the "any-authenticated" entry are granted (98) to the requesting user, including any permissions defined by action groups other than the Primary Action Group.

Further according to the preferred embodiment, an implicit "any-authenticated" entity exists when there is no explicit "any-authenticated" ACL entry, and this implicit entry grants no permissions. Thus, if no "any-authenticated" ACL entry is found, no permissions are granted (99).

The invention evaluates an unauthenticated user by granting the permissions from the ACL's "unauthenticated" entry. The "unauthenticated" entry is a mask (a bitwise "and" operation) against the "any-authenticated" entry when permissions are determined. A permission for "unauthenticated" is granted only if the permission also appears in the "any-authenticated" entry.

Since "unauthenticated" depends on "any-authenticated" it makes little sense for an ACL to contain unauthenticated without "any-authenticated." If an ACL does contain "unauthenticated" without "any-authenticated," the default response is to grant no permissions to "unauthenticated", according to the preferred embodiment.

Correspondingly, action groups may be used in the permission lists of the "unauthenticated" and "any-authenticated" entries in the enhanced ACL policies.

Thus, by creating action group definitions, and enhancing an authorization service to perform the disclosed logical processes, two objectives of the invention are achieved. First, the ease with which a system administrator may create and manage client rights and privileges is increased by allowing the administrator to define groups of actions which may logically contain similar or related actions. Second, the total number of allowable actions or permissions controlled by an ACL policy is expanded by allowing action indicators to be reused within each group, each having a specific action definition within each action group.

As such, the foregoing description has been set forth with particular details relating to the preferred embodiment. It will be recognized by those skilled in the art that many departures from the disclosed preferred embodiment, such as implementation of the method as a "stand alone" process, or inclusion of the method with alternate server software, operating systems or computing platforms, may be made without departing from the spirit and scope of the invention. Therefore, the scope of the present invention should be determined by the following claims.

What is claimed is:

1. A method for extending and grouping actions and permissions for authorization of a requesting user to access or use a requested protected system resource in a computer system, said method comprising the steps of:

providing in a computer readable medium an access control policy associated with said requested protected system resource containing a permission list of permitted identities and at least one action group tag with associated action indicators;

reusing a finite quantity of action indicators among a plurality of action group tags to control a number of unique permissions less than or equal to the product of the quantity of allowable action indicators and a quantity of allowable action group tags;

evaluating said permission list according to a specific permission definition associated with said action group tag, said permission definition providing a correlation between permissible actions and members of a set of action indicators; and granting to a requesting computer or program authorization to perform actions on said requested protected system resource to said requesting user if said access control policy permission list includes an appropriate action indicator correlated to an action group tag.

2. The method as set forth in claim 1 further comprising providing in an access control policy permission list a plurality of action group tags, each action group tag having one or more associated action indicators, such that resultant granting of authorization to act on said requested protected object is completed if the requested action is allowed by any of the associated action indicators of any of the action groups.

3. The method as set forth in claim 1 wherein said requested protected system resource comprises a computer file sent to a local computer from a remote computer over a computer network.

4. A method for managing permission indicators for computer system protected objects comprising the steps of:

providing in a computer readable medium a plurality of permission indicator containers in an access control list:

associating a first set of permission indicators with a primary permission indicator container;

associating in a computer readable medium accessible by an authorization control system one or more additional sets of permission indicators with additional permission indicator containers, wherein said permission indicators are reused among said containers such that permission indicators may be categorized and grouped logically to control a number of unique permissions less than or equal to the product of a quantity of allowable action indicators and a quantity of allowable action group tags; and granting authorization to a requesting computer or program to perform actions on said requested protected system resource according to said permission indicators in said permission indicator containers.

5. The method as set forth in claim 4 wherein said step of providing a first set of permission indicators comprises providing at least one other (additional) permission indicator set having equivalent permission indicators to said first set such that permission indicators may be assigned unique permissive control according to a permission indicator container with which they are associated.

6. The method as set forth in claim 5 wherein said step of providing an equivalent set of permission indicators comprises providing the characters "a" through "z" and "A" through "Z" as permission indicators.

7. The method as set forth in claim 4 further comprising associating an action group tag with a permission indicator container.

8. The method as set forth in claim 7 further comprising the step of providing an action group tag with an associated list of permission indicators in an access control list entry.

* * * * *